United States Patent Office 3,031,319
Patented Apr. 24, 1962

3,031,319
PREPARATION OF HYDROXYETHYLATED FLOURS
Earl B. Lancaster, Peoria, Ill., assignor to the United States of America as represented by the Secretary of Agriculture
No Drawing. Filed Nov. 18, 1958, Ser. No. 774,784
2 Claims. (Cl. 106—159)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of a catalyst and an improved method of preparing hydroxyethylated flours using the said catalyst hereafter referred to as the alkaline catalyst.

The catalyst which is used to prepare hydroxyethylated flours according to the invention avoids the hazards of grinding and mixing solid sodium hydroxide with the flour due to the evolution of excess heat and the possible injurious effects of the powder on the skin and mucous membranes of the operator. The alkaline catalyst method of hydroxyethylating flours is inexpensive because it does not require grinding or spray mixing of the whole product of the catalyst and flour mixture, and because it governs the sizes of the particles, and therefore the quality of the hydroxyethylated flours. The alkaline catalyst hydroxyethylated flour has a different chemical composition than those of the hydroxyethylated flours prepared by other methods because the alkali metal hydroxide does not come into intimate contact with the starch.

Hydroxyethylated cereal flour prepared by employing the above-mentioned catalyst composition may be used for sizing paper, textiles, cordage, for gumming stamps, envelopes, adhesives and pastes.

The present method is an improvement of the process described in Cereal Chemistry by Rankin, Mehltretter and Senti, and in U.S. patent application, Serial Number 622,506, filed November 15, 1956, now Patent No. 2,900,268.

In the previous art, it is generally believed that in the reaction of ethylene oxides and the like with starches or celluloses that the sodium hydroxide used as a catalyst must be homogeneously dispersed in the starch within its granule, and therefore the hydroxyethylated part of the starch is uniformly distributed within the mass. In the above-mentioned patent application, besides the fact that the product contains other reacted material than starch, the starch itself is reacted heavily at some sites and little at others—such as on the interior of the granule. In this respect it is a product different from those made by the previous arts. In this same copending patent application the method of adding the sodium hydroxide catalyst is to grind solid sodium hydroxide and distribute it in the flour by shaking the dry materials together. When this is done, it has been found that the product, when passed through a fine set of screens contains translucent particles of larger size than the remainder of the product, or of the parent flour.

If these particles are small enough, they do not seriously interfere with the quality of the product when it is used to prepare pastes, but we have found that in grinding solid sodium hydroxide and adding it to a flour, it is difficult to avoid formation of these large particles.

On further examination of these particles, it was found that they contained excessive amounts of sodium hydroxide, and their presence indicates that in this particular reaction of ethylene oxide with a starchy material, the catalyst does not necessarily have to be uniformly distributed. Since it is unlikely that there is ionic migration in the dry state, this proves that this particular reaction occurs on the surface of the starch granules or at specific sites around regions of high catalyst concentration. Thus, even the starchy parts of the flour should be different in distribution of reacted ethylene oxide than the starches reacted in prior art.

In order to avoid the difficulty of grinding solid sodium hydroxide and mixing it with the flour, it was found that 50 percent aqueous sodium hydroxide could be added to a small portion of the flour to raise the sodium hydroxide content of this portion to 20 percent, and that the dry material so prepared could be ground and admixed with the remainder of the flour to give a sodium hydroxide concentration of 2.5 percent. A mixture so prepared absorbed ethylene oxide at an efficient rate.

This catalyst preparation does not consist of starchates prepared by prior art, since it is prepared under specific conditions using water and avoiding excessive heats. Little reaction of sodium hydroxide with the flour occurs, as evidenced by the ordinarily small difference in titration between endpoint with phenolphthalein and methyl red indicators, which indicates little or no sodium compound formation.

Since the freshly prepared catalyst is not, as with the sodium starchates, in its original granular form, but rather highly aggregated, indicating some gelatinization of the starch, and must be ground to pass a screen at least as small as 60 mesh before it is suitable for adding to the remainder of the flour, it may be necessary to partially dry the catalyst either by long periods in the atmosphere or for shorter ones at 60° C. in order to obtain sufficient friability so that it can be finely ground in a hammer mill. Certain changes occur in this drying operation so that it may be necessary to hold the mixture of catalyst and flour for several hours in order to expedite the reaction.

EXAMPLE

The method of preparing the solid reaction mixture was to add to a given weight of flour a catalyst preparation made from the same flour as follows: To 300 g. of flour in a sigma-blade mixer 140 cc. of 50 percent NaOH solution were added over a period of at least 10 minutes. The moist granular mixture was then heated at 140° F. for at least 1 hour in a forced-draft oven. After cooling, the mixture was ground in a Mikro-Pulverizer using a .020-inch screen. The larger material on the first grind was reground until less than 5 percent was retained on a 60-mesh screen. An amount of material passing a 60-mesh screen was then used so that the NaOH content of the reaction mixture was about 2.5 percent on a dry-solids basis. In most of the runs, 7.3 pounds of dry flour were used, giving a product yield of 9 to 11 pounds of finished product with a moisture content of about 10 percent.

The NaOH content of the catalyst was estimated by adding about 150 ml. of water to a flask containing about .25 g. of catalyst accurately weighed. The mixture was titrated with .10 N HCl to a phenolphthalein and then a methyl red endpoint. The differences, indicating sodium compounds, were relatively small.

The flours used consisted of several lots, grades, and types of wheat flour, two types of corn flour, and a commercially available grain sorghum product. Any differences between them during the hydroxyethylation reaction appear to be minor.

For comparison in the earliest experiments, several methods of incorporating the NaOH catalyst into the flour were tried. In one experiment NaOH was ground in an attrition mill mounted in a dry-air box, the powder was added to 2 pounds of flour, and the mixture re-ground.

In another experiment the NaOH was ground in a mortar and pestle, screened through 140-mesh screen, and added to the flour. Despite all precautions, appreciable quantities of large, pink, jellylike particles were found in the final product. The minimum amount was about 0.5 percent over a 16-mesh screen. These particles were analyzed, and found to contain about double the NaOH and moisture concentrations of the remaining product, and about one-fourth of the protein content.

It was found that considerable 50-percent NaOH could be added to flour without appreciable plasticity developing in the flour, but that at a certain stage of the addition, granulation occurs with a consequent swelling of the mass. Some ammonia is liberated near the end of the addition, and the mass liberates heat. The finished mixture is a mass of relatively soft aggregates, 80 percent of which pass a 30-mesh screen. This material, when fresh, could be readily ground in a "pug" mill, but attrition or hammer mills caused it to plasticize.

It was noticed that on standing in the room, the catalyst particles became harder. It was found that the catalyst loses moisture with little gain in carbonate. The dried catalyst may be readily ground in a hammer mill so that it all passes a 60-mesh screen. When this catalyst is used immediately, the reaction rate is cut in about half, but when it is mixed with the flour and the mixture allowed to age for over 2 days, the reaction proceeds as usual. In any case, there are no particles in the product larger than 30-mesh, and the pastes made from the product seem to be greatly improved.

In order to avoid the long aging times, catalysts were prepared by oven-drying the fresh material. Some yellowing occurred, and the dried material was somewhat softer than air-dried catalyst. It was found that the oven-dry material could be ground in a hammer mill.

Examples of the use of the various catalysts for 12 percent ethylene oxide substituted flours are shown in Table I.

*Table I.—Comparison of Catalysts*

| Run | Catalyst Prepn. Method | Catalyst Part. Size | Aging | Final Rate, p.s.i.g./min. at 15 p.s.i.g. | Product Part. Size, percent over 60-mesh |
|---|---|---|---|---|---|
| 2 | Dry NaOH machine ground | | No | (low pressure) | 26 |
| 4 | Dry NaOH hand ground and screened. | | No | do | 14.5 |
| 6 | Wet NaOH, pug ground | 100% through 30-mesh | No | 0.2 | 18.5 |
| 8 | Same as 6 | | | 0.5 | 15-30 |
| 9a | Wet NaOH, air dry, hammer ground. | 65% through 140-mesh | Yes | 0.6 | 7.5 |
| 9b | Same | 63% through 140-mesh | No | 0.2 | 7 |
| 10 | Wet NaOH, oven dry, hammer ground. | 70% through 140-mesh, 7% 60-100-mesh. | No | 0.6 | 7 |

The table shows that 9a and 10 produce the most efficient rate of reaction and the most uniform particle size product.

I claim:

1. A process for producing free flowing powdered hydroxy-alkylated flour which comprises adding to a dry flour selected from the group consisting of wheat flour, corn flour, and grain sorghum an hydroxyalkylation catalyst produced by adding a 50% to saturated aqueous solution of an alkali metal hydroxide to a dry flour selected from the group consisting of wheat flour, corn flour, and grain sorghum, said aqueous solution being added in an amount sufficient to form a moist granular mass containing about 20% by weight of the alkali metal hydroxide solution, reducing the moisture content of the mass to about from 10 to 15% by mild heating, and then finely grinding and screening the mass, said catalyst being added in an amount to provide about a 2.5% concentration of the alkali metal hydroxide in the total flour-catalyst mixture, and reacting the said mixture of flour and added catalyst with an alkylene oxide to produce a free flowing powdered hydroxyalkylated flour.

2. The process of claim 1 wherein the alkali metal hydroxide is sodium hydroxide.

References Cited in the file of this patent

UNITED STATES PATENTS

| | | |
|---|---|---|
| 2,516,633 | Kesler et al. | July 25, 1950 |
| 2,516,634 | Kesler et al. | July 25, 1950 |
| 2,609,370 | Gaver et al. | Sept. 2, 1952 |
| 2,733,238 | Kerr et al. | Jan. 31, 1956 |
| 2,900,268 | Rankin et al. | Aug. 18, 1959 |

FOREIGN PATENTS

| | | |
|---|---|---|
| 741,742 | Great Britain | Dec. 14, 1955 |